United States Patent
Aoki et al.

(10) Patent No.: US 11,015,542 B2
(45) Date of Patent: May 25, 2021

(54) PLUG-IN HYBRID VEHICLE AND CONTROL METHOD THEREOF

(71) Applicant: TOYOTA JIDOSHA KABUSHIKI KAISHA, Toyota (JP)

(72) Inventors: Kazuma Aoki, Toyota (JP); Koji Hokoi, Toyota (JP); Yu Nakao, Toyota (JP); Kohichiroh Yonemura, Toyota (JP); Yusuke Furuhashi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/673,340

(22) Filed: Nov. 4, 2019

(65) Prior Publication Data

US 2020/0158039 A1    May 21, 2020

(30) Foreign Application Priority Data

Nov. 21, 2018  (JP) .............................. JP2018-218226

(51) Int. Cl.

| F01N 3/00 | (2006.01) |
|---|---|
| F02D 41/02 | (2006.01) |
| B60W 20/00 | (2016.01) |
| B60W 10/06 | (2006.01) |
| F01N 3/021 | (2006.01) |
| B60L 58/13 | (2019.01) |

(52) U.S. Cl.
CPC ............ *F02D 41/029* (2013.01); *B60L 58/13* (2019.02); *B60W 10/06* (2013.01); *B60W 20/00* (2013.01); *F01N 3/021* (2013.01); *F02D 2200/0802* (2013.01)

(58) Field of Classification Search
CPC ...... B60L 58/13; F02D 41/029; B60W 10/06; B60W 20/00; B60W 2710/244; F01N 3/021
USPC .......................................................... 60/285
See application file for complete search history.

(56) References Cited

U.S. PATENT DOCUMENTS

| 2012/0310458 | A1* | 12/2012 | Nawata .................. | B60W 10/30 701/22 |
|---|---|---|---|---|
| 2017/0028980 | A1* | 2/2017 | Ogawa .................. | B60W 20/14 |
| 2017/0028981 | A1* | 2/2017 | Ogawa .................. | B60W 20/12 |
| 2018/0094556 | A1* | 4/2018 | Kurtz .................. | F02D 41/1446 |
| 2018/0216552 | A1* | 8/2018 | Yokoi ..................... | F01N 3/021 |

(Continued)

FOREIGN PATENT DOCUMENTS

JP          2011-032969 A      2/2011

*Primary Examiner* — Jason D Shanske
(74) *Attorney, Agent, or Firm* — Sughrue Mion, PLLC

(57) ABSTRACT

A plug-in hybrid vehicle of the present disclosure includes an internal combustion engine, a particulate filter configured to collect particulate matter in exhaust gas of the internal combustion engine, an electric motor that outputs a driving force and a regenerative braking force to a wheel, a power storage device that exchanges electric power with the electric motor and is chargeable with electric power from an external power supply, and a controller programmed to decrease a target SOC for charging the power storage device with the electric power from the external power supply when a deposition amount of the particulate matter in the particulate filter is more than a predetermined value, compared to when the deposition amount of the particulate matter in the particulate filter is equal to or less than the predetermined value.

7 Claims, 4 Drawing Sheets

(56) References Cited

U.S. PATENT DOCUMENTS

| | | | |
|---|---|---|---|
| 2019/0168735 A1* | 6/2019 | Morisaki | B60W 20/16 |
| 2020/0182118 A1* | 6/2020 | Yokoi | F01N 3/105 |

* cited by examiner

PLUG-IN HYBRID VEHICLE AND CONTROL METHOD THEREOF

The present disclosure claims priority to Japanese Patent Application No. 2018-218226 filed on 21 Nov. 2018, which is incorporated herein by reference in its entirety including specification, drawings and claims.

TECHNICAL FIELD

The present disclosure relates to a plug-in hybrid vehicle with a particulate filter configured to collect particulate matter in exhaust gas of an internal combustion engine, and to a control method thereof.

BACKGROUND

A conventionally known plug-in hybrid vehicle includes a generator, an engine that drives the generator, a battery chargeable with electric power from the generator and an external power supply, and an electric motor that exchanges electric power with the generator and the battery to output power to wheels (as described in, for example, JP 2011-32969A). The plug-in hybrid vehicle further includes a particulate filter disposed on an exhaust passage of the engine to collect particulate matter in exhaust gas. The particulate filter includes an electric heater supplied with electric power from the external power supply and a temperature sensor. A power supply from the external power source to the electric heater is permitted only when temperature detected by the temperature sensor is equal to or higher than a first predetermined temperature that is lower than a regenerable minimum temperature. This enables a power consumption for a regeneration of the particulate filter to be reduced.

SUMMARY

In the plug-in hybrid vehicle as described above, the engine in a fuel-cut state is motored (rotated) by the generator driven with a regenerative power from the electric motor (by the generator that consumes the regenerative power) when a regenerative braking force is output from the electric motor in response to a braking demand in a state where SOC is high and an allowable charging power (Win) of the battery becomes small as a charging power, such that a battery charging with the regenerative power is suppressed while securing deceleration. However, the temperature (bed temperature) of the particulate filter becomes high when a large amount of particulate matter is deposited on the particulate filter. Therefore, when air (new air) is fed from the motored engine to the particulate filter that collects a predetermined amount or more of particulate matter, the particulate filter is overheated and deteriorates by combustion (reaction) of the particulate matter.

A main object of the present disclosure is to suppress overheating of the particulate filter that collects particulate matter in the exhaust gas of the internal combustion engine while securing deceleration of the plug-in hybrid vehicle when braking is demanded.

A plug-in hybrid vehicle of the present disclosure includes an internal combustion engine, a particulate filter configured to collect particulate matter in exhaust gas of the internal combustion engine, an electric motor that outputs a driving force and a regenerative braking force to a wheel, and a power storage device that exchanges electric power with the electric motor and is chargeable with electric power from an external power supply. The plug-in hybrid vehicle includes a controller programmed to decrease a target SOC for charging the power storage device with the electric power from the external power supply when a deposition amount of the particulate matter in the particulate filter is more than a predetermined value, compared to when the deposition amount of the particulate matter in the particulate filter is equal to or less than the predetermined value.

DESCRIPTION OF EMBODIMENTS

The following describes some embodiments of the disclosure with reference to drawings.

Figure 1:
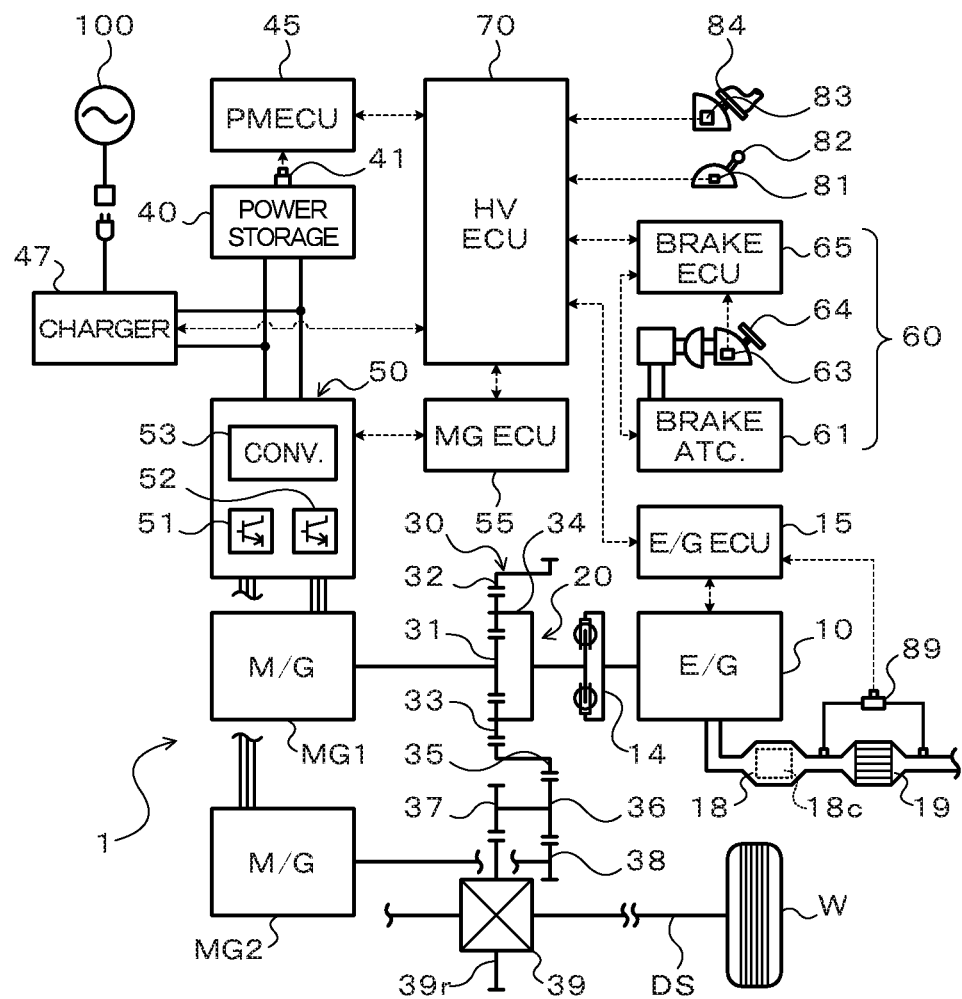
FIG. 1 is a schematic configuration diagram illustrating the plug-in hybrid vehicle according to the present disclosure.

FIG. 1 is a schematic configuration diagram illustrating a plug-in hybrid vehicle (hereinafter suitably referred to as "hybrid vehicle") 1 according to the present disclosure. The hybrid vehicle 1 shown in FIG. 1 includes an engine 10, a single pinion planetary gear 30, motor generators MG1 and MG2 respectively configured as a synchronous motor generator (three-phase AC motor), a power storage device (battery) 40 chargeable with electric power from an external power supply 100 that is a household power supply, a quick charger installed on a stand, or the like, a power control unit (hereinafter referred to as "PCU") 50 connected with the power storage device 40 and configured to drive the motor generators MG1 and MG2, an electronic control hydraulic braking device 60 capable of applying a friction braking force to wheels W, and a hybrid electronic control unit (hereinafter referred to as "HVECU") 70 configured to control the entire vehicle. In hybrid vehicle 1, engine 10, planetary gear 30, and motor generators MG1 and MG2 constitute a hybrid power generator.

The engine 10 is an internal combustion engine configured to generate power by explosive combustion of a mixture of a hydrocarbon fuel such as gasoline, light oil, liquefied petroleum gas or the like and the air. The engine 10 is controlled by an engine electronic control unit (hereinafter referred to as "engine ECU") 15 that includes a microcomputer with a CPU and the like (not shown). As shown in FIG. 1, the engine 10 further includes an exhaust emission purifier 18 connected to an exhaust pipe, and a particulate filter (fine particle collector) 19 disposed downstream of the exhaust emission purifier 18.

The exhaust emission purifier 18 includes a NOx storage exhaust purification catalyst (three-way catalyst) 18c that purifies harmful components such as CO (carbon monoxide), HC, and NOx in exhaust gas flowing from combustion chambers of the engine 10 through the exhaust pipe. The particulate filter 19 is a gasoline particulate filter (GPF) or a diesel particulate filter (DPF) that collects particulate matter (particulates) in the exhaust gas flowing from the combustion chambers of the engine 10 through the exhaust pipe. The particulate filter 19 includes a differential pressure sensor 89 that detects a differential pressure of the exhaust gas between an upstream side and a downstream side of the particulate filter 19. A detected value of the differential pressure sensor 89 is transmitted to the engine ECU 15. The engine ECU 15 calculates (estimates) a deposition amount Dpm of particulate matter in the particulate filter 19 at predetermined time intervals based on the detected value of the differential pressure sensor 89 when the hybrid vehicle 1 is activated. The engine ECU 15 stores the deposition amount Dpm in a non-volatile memory (not shown).

The planetary gear 30 is a differential rotation mechanism that includes a sun gear (first element) 31, a ring gear (second element) 32, and a planet carrier (third element) 34 that rotatably supports a plurality of pinion gears 33. The sun gear 31 is coupled to a rotor of the motor generator MG1. The planet carrier 34 is coupled to a crankshaft (output shaft) of the engine 10 via a damper mechanism 14. The ring gear 32 is integral with a counter drive gear 35 or an output member and coaxially and integrally rotates with the counter drive gear 35.

The counter drive gear 35 is coupled to left and right wheels W (drive wheels) via a counter driven gear 36 that meshes with the counter drive gear 35, a final drive gear (drive pinion gear) 37 that integrally rotates with the counter driven gear 36, a final driven gear (differential ring gear) 39r that meshes with the final drive gear 37, a differential gear 39 and drive shafts DS. The planetary gear 30, the gear train from the counter drive gear 35 to the final driven gear 39r and the differential gear 39 constitute a transaxle 20 that couples the engine 10 and the motor generator MG1 to the wheels W and couples the engine 10 and the motor generator MG1 to each other.

A drive gear 38 is fixed to a rotor of the motor generator MG2. The drive gear 38 has a smaller number of teeth than the counter driven gear 36 and meshes with the counter driven gear 36. Thus, motor generator MG2 is coupled to left and right wheels W (drive wheels) via the drive gear 38, the counter driven gear 36, the final drive gear 37, the final driven gear 39r, the differential gear 39, and the drive shafts DS.

The motor generator MG1 (second electric motor) is mainly operated as a generator that generates electric power with at least a part of the power from the engine 10 under load operation. The motor generator MG2 (electric motor) is mainly driven by at least one of the electric power from the power storage device 40 and the electric power from the motor generator MG1 so as to operate as an electric motor that generates a driving torque and outputs a regenerative braking torque when braking the hybrid vehicle 1. The motor generators MG1 and MG2 are capable of exchanging the power with the electric power storage device 40 via the PCU 50 and exchanging the electric power with each other via the PCU 50.

The power storage device 40 is, for example, a lithium ion secondary battery or a nickel hydrogen secondary battery, and is managed by a power management electronic control unit (hereinafter referred to as "power management ECU") 45 that includes a microcomputer with a CPU and the like (not shown). The power management ECU 45 derives SOC (charging rate), an allowable charging power Win, an allowable discharging power Wout and the like of the storage device 40 based on an inter-terminal voltage VB from a voltage sensor of the power storage device 40, a charging/discharging current IB from a current sensor, a battery temperature Tb from a temperature sensor 41 (see FIG. 1), and the like.

Figure 2:
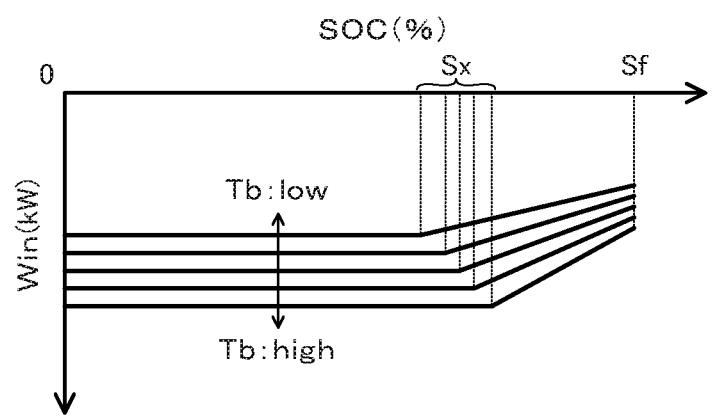
FIG. 2 is an explanation view exemplifying an allowable charging power setting map used for setting the allowable charging power of the power storage device in the plug-in hybrid vehicle of FIG. 1.

For example, the allowable charging power Win of the power storage device 40 is derived from an allowable charging power setting map exemplified in FIG. 2. The allowable charging power setting map of FIG. 2 is prepared in advance so as to define a relationship between the SOC of the power storage device 40, the battery temperature Tb and the allowable charging power Win, and is stored in a ROM (not shown) of the power management ECU 45. In the present embodiment, the allowable charging power setting map is prepared such that it basically increases the allowable charging power Win as a charging power (increases an absolute value) in accordance with a decrease in the SOC and sets the allowable charging power Win as the charging power to be smaller (decreases the absolute value) as the battery temperature Tb is lower. More specifically, the allowable charging power setting map is prepared such that it increases the absolute value of the allowable charging power Win as the SOC decreases from a predetermined value Sf (for example, 80%) in a fully charged state and sets the allowable charging power Win to a constant value corresponding to the battery temperature Tb when the SOC becomes equal to or less than a threshold Sx predetermined for each battery temperature Tb.

Further, the hybrid vehicle 1 of the present embodiment includes a charger 47 for charging the power storage device 40 with the electric power from the external power supply 100. The charger 47 includes an AC/DC converter that converts AC power supplied from the external power supply 100 via a power receiving connector and the like into DC power, a DC/DC converter that converts a voltage of DC power from the AC/DC converter, and the like (all not shown). The charger 47 (DC/DC converter) is connected to power lines that connect the power storage device 40 and the PCU 50 via charging relays (not shown), and is controlled by the HVECU 70 in the present embodiment. Further, in the hybrid vehicle 1, a display or the like installed in an instrument panel includes a time setting section (not shown) to set a scheduled departure time of the hybrid vehicle 1, a start time (charging start time) of a charging of the power storage device 40 with the electric power from the external power supply 100 (hereinafter suitably referred to as "external charging") and the like. The HVECU 70 acquires the time set by a user (driver or the like) via the time setting section and starts the external charging at a timing according to the acquired time.

The PCU 50 includes a first inverter 51 configured to drive the motor generator MG1, a second inverter 52 configured to drive the motor generator MG2, a boost converter (voltage conversion module) 53 capable of boosting the electric power from power storage device 40 and stepping down the electric power from the side of motor generators MG1 and MG2, and the like. The PCU 50 is controlled by a motor electronic control unit (hereinafter referred to as "MGECU") 55 including a microcomputer with a CPU and the like (not shown). The MGECU 55 acquires command signals from the HVECU 70, a pre-boost voltage and a post-boost voltage of the boost converter 53, detected values of resolvers (not shown) that detects rotational positions of rotors of the motor generators MG1 or MG2, phase currents applied to the motor generators MG1 and MG2, and the like. MGECU 55 performs switching control of the first and second inverters 51 and 52 and boost converter 53 based on these signals. Further, MGECU 55 calculates rotation speeds Nm1 and Nm2 of the rotors of motor generators MG1 and MG2 based on the detection values of the resolvers.

The hydraulic braking device 60 includes a master cylinder, a plurality of brake pads respectively pressed against a corresponding brake disc attached to each wheel W so as to apply a braking torque (friction braking torque) to the corresponding wheel W, a plurality of wheel cylinders respectively driving the corresponding brake pad (all not shown), a hydraulic brake actuator 61 that supplies hydraulic pressure to each of the wheel cylinders, a brake electronic control unit (hereinafter referred to as a "brake ECU") 65 that controls the brake actuator 61, and the like. The brake ECU 65 includes a microcomputer with a CPU and the like (not shown). The brake ECU 65 acquires command signals from the HVECU 70, a brake pedal stroke BS (depressed amount of the brake pedal 64) detected by a brake pedal stroke sensor 63, a vehicle speed detected by a vehicle speed sensor (not shown) and the like, and controls the brake actuator 61 based on these signals.

The HVECU 70 includes a microcomputer with a CPU, a ROM, a RAM, an input/output device and the like (not shown). The HVECU 70 mutually exchanges information (communication frame) with the ECUs 15, 45, 55, 65 and the like via a common communication line (multiplex communication bus, not shown) which is a CAN bus including two communication lines (wire harnesses) of Lo and Hi. Further, the HVECU 70 is individually connected with each of the ECUs 15, 45, 55 and 65 via a dedicated communication line (local communication bus) which is a CAN bus including two communication lines (wire harnesses) of Lo and Hi. The HVECU 70 mutually exchanges information (communication frame) with each of the ECUs 15, 45, 55 and 65 via the corresponding dedicated communication line. Furthermore the HVECU 70 acquires, for example, a signal from a start switch (not shown) for instructing a system activation of the hybrid vehicle 1, a shift position SP of a shift lever 82 detected by a shift position sensor 81, an accelerator opening Acc (depressed amount of an accelerator pedal 84) detected by an accelerator pedal position sensor 83, the vehicle speed detected by the vehicle speed sensor (not shown), the rotation speeds Nm1 and Nm2 of the motor generators MG1 and MG2 from the MGECU 55, and the like.

The HVECU 70 derives a required torque Tr* (including a required braking torque) to be output to the drive shafts DS corresponding to the accelerator opening Acc and the vehicle speed from a required torque setting map (not shown) when the hybrid vehicle 1 is driven, and sets a required driving power Pd* required for driving the hybrid vehicle 1 based on the required torque Tr* and a rotation speed Nds of the drive shafts DS. Further, the HVECU 70 determines whether or not the load operation of the engine 10 is to be executed based on the required torque Tr*, the required driving power Pd*, a target charging/discharging power Pb* and the allowable discharging power Wout of the storage device 40, and the like. When the load operation of the engine 10 is executed, the HVECU 70 sets a target power Pe* of the engine 10 based on the required driving power Pd* and the separately set target charging/discharging power Pb* of the storage device 40 such that the engine 10 is efficiently operated, and sets a target rotation speed Ne* the engine 10 corresponding to the target power Pe*. Further, the HVECU 70 sets torque commands Tm1* and Tm2* for motor generators MG1 and MG2 corresponding to the required torque Tr*, the target rotation speed Ne* and the like within a range of the allowable charging power Win and the allowable discharging power Wout. On the other hand, when stopping the operation of engine 10, the HVECU 70 sets the target power Pe*, the target rotation speed Ne* and the torque command Tm1* to value 0, and sets the torque command Tm2* within the range of the allowable charging power Win and the allowable discharging power Wout such that the motor generator MG2 outputs a torque corresponding to required torque Tr* to the drive shafts DS.

Then, the HVECU 70 sends the target power Pe* and the target rotation speed Ne* to the engine ECU 15, and sends the torque commands Tm1* and Tm2* to the MGECU 55. The engine ECU 15 executes an intake air amount control, a fuel injection control, an ignition timing control and the like based on the target power Pe* and the target rotation speed Ne*. The MGECU 55 executes switching control of the first and second inverters 51 and 52 and the boost converter 53 based on the torque commands Tm1* and Tm2*. When the load operation of the engine 10 is executed, the motor generators MG1 and MG2 are controlled so as to perform a torque conversion of a part (at the time of charging) or all (at the time of discharging) of the power output from engine 10 together with planetary gear 30 and output it to the drive shafts DS. Thus, the hybrid vehicle 1 is driven by the power (direct torque) from the engine 10 and the power from the motor generator MG2 (HV drive). On the other hand, when the operation of the engine 10 is stopped, the hybrid vehicle 1 is driven by only the power from the motor generator MG2 (EV drive).

Further, the HVECU 70 sets a drive mode of the hybrid vehicle 1 to a CD (Charge Depleting) mode or a CS (Charge Sustaining) mode in accordance with the SOC of the power storage device 40. The CD mode gives priority to the EV drive in which the operation of the engine 10 is stopped so as to promote consumption of the power stored in the power storage device 40 over the HV drive in which engine 10 is operated. The CS mode gives priority to the HV drive over the EV drive. In the plug-in type hybrid vehicle 1 with the power storage device 40 chargeable with the electric power from the external power supply 100, the CD mode and the CS mode are selectively set so as to increase opportunities for executing the EV drive thereby improving a fuel efficiency.

That is, the HVECU 70 sets the drive mode to the CD mode when the SOC of the power storage device 40 is more than a predetermined first threshold (for example, a value of about 45 to 55%) at a system startup. When the drive mode is set to the CD mode, the target charging/discharging power Pb* of the power storage device 40 is set to the value 0, and a start determination threshold of the engine 10 is set to make it difficult to be started compared to when the drive mode is set to the CS mode. Thus, when the drive mode is set to the CD mode, the EV drive may be executed in preference to the HV drive. When the SOC of the storage device 40 becomes equal to or less than a second threshold (for example, a value of about 25 to 35%) that is smaller than the first threshold while the hybrid vehicle 1 is driven in the CD mode, the HVECU 70 switches the drive mode from the CD mode to the CS mode. While the hybrid vehicle 1 is driven in the CS mode, the engine 10 and motor generators MG1 and MG2 are controlled such that the SOC of the power storage device 40 is included in a predetermined range. In the present embodiment, a mode switch (not shown) is connected to the HVECU 70 to allow the driver to switch (select) the drive mode between the CD mode and the CS mode. Thus, the driver of the hybrid vehicle 1 may select a desired one of the CD mode and the CS mode as the drive mode by operating the mode switch.

Further, when the driver releases a depression of the accelerator pedal 84 or when the driver cancels the depression of the accelerator pedal 84 and depresses the brake pedal 64 in the hybrid vehicle 1, the engine 10 in a fuel-cut state is motored (rotated) according to the situation by the motor generator MG1 driven with at least one of the electric power from the power storage device 40 and the power (regenerative power) from the motor generator MG2 that outputs the regenerative braking torque such that the crankshaft rotates at the target speed Ne* corresponding to the vehicle speed. Thus, a friction torque (braking torque) of the engine 10 is output to the drive shafts DS and a rotation speed Ne of the engine 10 is increased (blown up) to improve the feeling of deceleration of the hybrid vehicle 1.

Here, when the allowable charging power Win becomes small as the charging power in accordance with the SOC and the like of the power storage device 40, it is necessary to suppress an overcharge of the power storage device 40 with the power regenerated by the motor generator MG2 from the view point of protection of the power storage device 40 and an improvement of efficiency. Accordingly, when the allowable charging power Win becomes small as the charging power in accordance with the SOC and the like, the engine 10 in the fuel-cut state is preferably motored (rotated) by the motor generator MG1 driven by at least one of the electric power from power storage device 40 and the regenerative power from the motor generator MG2 in response to a release of the depression of accelerator pedal 84 and/or a depression of the brake pedal 64. However, when the engine 10 is motored by the motor generator MG1, the particulate filter 19 becomes rich in oxygen due to air (oxygen) fed from the engine 10. Further, when a large amount of particulate matter is deposited on the particulate filter 19, a bed temperature of the particulate filter 19 becomes high. For this reason, when air is fed from the motored engine 10 to the particulate filter 19 on which a large amount of particulate matter is deposited, the particulate filter 19 may be overheated and deteriorated by combustion (reaction) of the particulate matter.

Figure 3:
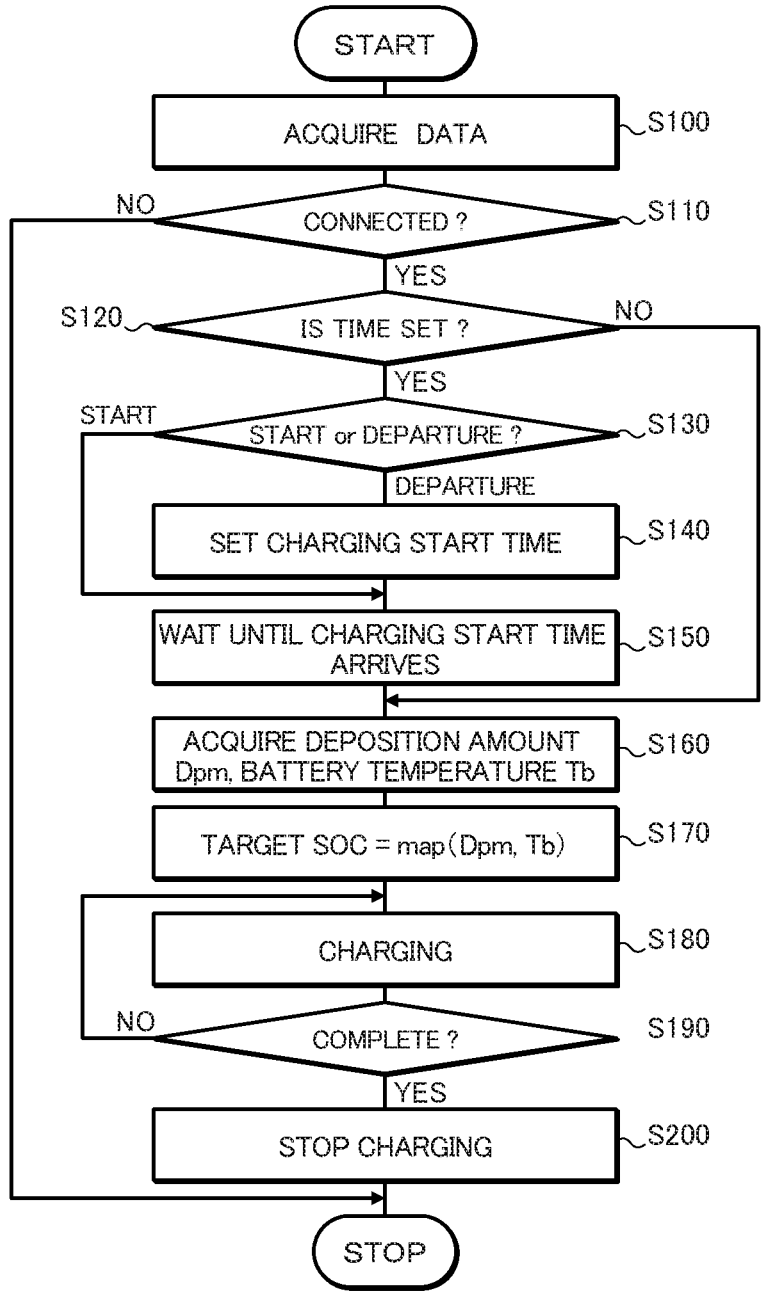
FIG. 3 is a flowchart exemplifying an external charging control routine executed in the plug-in hybrid vehicle of FIG. 1.

Based on these, in the hybrid vehicle 1 of the present embodiment, when charging the power storage device 40 with the electric power from the external power supply 100, a target SOC of the power storage device 40 is set in consideration of a deposition state of the particulate matter in the particulate filter 19. FIG. 3 is a flow chart showing an example of an external charge control routine executed by the HVECU 70 to charge the power storage device 40 with the electric power from external power supply 100. The external charge control routine is started by the HVECU 70 when a predetermined time (for example, about 5 minutes) elapses after the start switch is turned off and system main relays (not shown) between the storage device 40 and the PCU 50 are opened (turned off). The external charge control routine of FIG. 3 may be executed by the power management ECU 45, for example.

When a start timing of the external charge control routine arrives, the HVECU 70 acquires various data necessary for an execution of the routine (Step S100), and determines whether or not the power receiving connector of the hybrid vehicle 1 is connected to a power transmission connector of the external power supply 100 (Step S110). When determining that the power receiving connector is not connected to the power transmission connector (Step S110: NO), the HVECU 70 terminates the routine without executing subsequent processes. On the other hand, when determining that the power receiving connector is connected to the power transmission connector (Step S110: YES), the HVECU 70 determines whether or not the scheduled departure time or the charging start time of the hybrid vehicle 1 is set by the user (Step S120).

When determining that the scheduled departure time or the charging start time is set (Step S120: YES), the HVECU 70 determines which of the scheduled departure time and the charging start time is set (Step S130). When determining that the scheduled departure time of the hybrid vehicle 1 is set by the user (Step S130: YES), the HVECU 70 sets the charging start time for starting the external charging based on the scheduled departure time, the present SOC of the storage device 40, the target SOC set during a last execution of the routine, and the like (Step S140). After setting the charging start time in Step S140, the HVECU 70 waits until the charging start time arrives (Step S150). When determining that the charging start time of the power storage device 40 is set by the user (Step S130: NO), the HVECU 70 skips the process of Step S140 and waits until the charging start time arrives (Step S150).

When the charging start time set by the user or in Step S140 arrives, the HVECU 70 acquires the deposition amount Dpm of the particulate matter in the particulate filter 19 (stored in the non-volatile memory) from the engine ECU 15 (Step S160). In Step S160, the HVECU 70 also acquires the battery temperature Tb at that time (at a start of the charging of the storage device 40) from the power management ECU 45. When determining that both the charging start time and the scheduled departure time are not set by the user (Step S120: NO), the HVECU 70 executes the process of Step S160 at that time. Subsequently, the HVECU 70 derives a value corresponding to the deposition amount Dpm and the battery temperature Tb acquired in Step S160 from the target SOC setting map exemplified in FIG. 4 and sets the target SOC to the derived value (Step S170).

Figure 4:
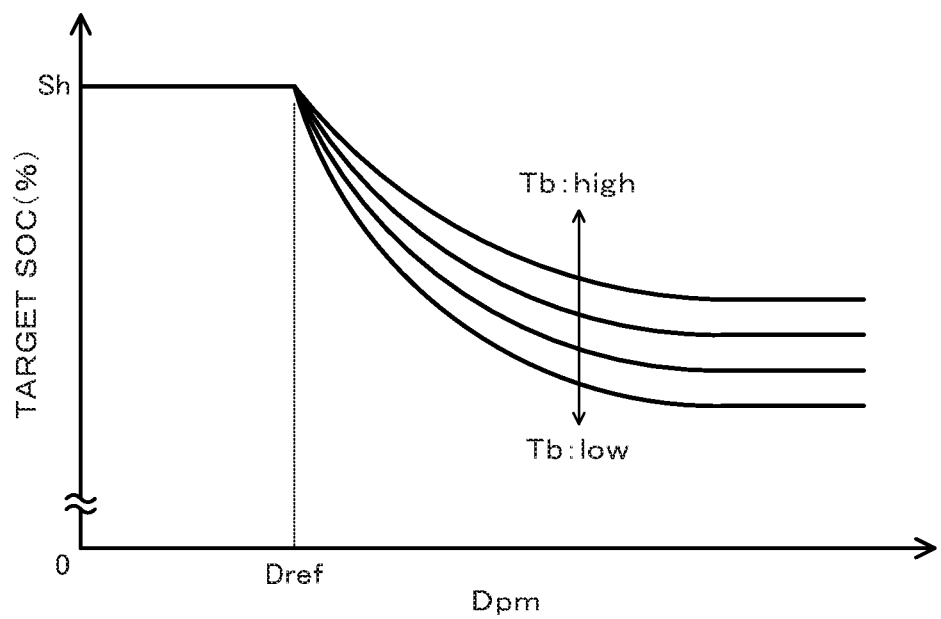
FIG. 4 is an explanation view exemplifying a target SOC setting map used for setting the target SOC.

The target SOC setting map shown in FIG. 4 is prepared in advance so as to define a relationship between the deposition amount Dpm and the battery temperature Tb, and the target SOC at the time of charging the storage device 40 with the electric power from the external power supply 100, and is stored in the ROM (not shown) of the HVECU 70. When preparing the target SOC setting map, a relationship between the deposition amount Dpm of the particulate matter and the bed temperature of the particulate filter 19 is specified by experiment, analysis, and the like. Then, a maximum value of the deposition amount which may not cause overheating of the particulate filter 19 when air (fresh air) is fed to the particulate filter 19 is determined as a threshold value Dref from the relationship between the deposition amount Dpm and the bed temperature. In the present embodiment, the target SOC setting map is prepared so as to set the target SOC to a predetermined constant value Sh (for example, 80%) when the deposition amount Dpm is equal to or less than the threshold value Dref. Further, the target SOC setting map is prepared so as to set the target SOC to decrease with an increase in the deposition amount Dpm and to be smaller as the battery temperature Tb at the start of the external charging is lower when the deposition amount Dpm is more than the threshold value Dref. Furthermore, the target SOC setting map of the present embodiment is prepared so as to converge the target SOC to a constant value in accordance with the increase in the deposition amount Dpm for each battery temperature Tb when the deposition amount Dpm is more than the threshold value Dref. Each convergence value of the target SOC for each battery temperature Tb is the above threshold value Sx of the battery temperatures Tb that sets the allowable charging power Win to the constant value.

After setting the target SOC in Step S170, the HVECU 70 closes the system main relays and the charging relays, and controls the charger 47 such that power storage device 40 is charged with the electric power from external power supply 100 (Step S180). Then, the HVECU 70 determines whether or not the SOC of the power storage device 40 has reached the target SOC and the charging of the power storage device 40 is completed (Step S190). When determining that the SOC has reached the target SOC (Step S190: YES), the HVECU 70 stops the charging of power storage device 40 with the electric power from external power supply 100 (Step S200) and terminates the routine.

As a result of the execution of the above routine of FIG. 3, when the deposition amount Dpm of the particulate matter in the particulate filter 19 is more than the threshold value (predetermined amount) Dref, the target SOC at the time of the external charging, that is, the SOC of the power storage device 40 at the completion of the external charging becomes lower compared to when the deposition amount Dpm is equal to or less than the threshold value Dref. Thus, the allowable charging power Win of the power storage device 40 becomes large as the charging power when the deposition amount Dpm of the particulate matter is more than the threshold value Dref and the particulate filter 19 may overheat, such that the power storage device 40 is charged with the electric power regenerated by the motor generator MG2 in response to a braking demand by the release of the depression of accelerator pedal 84 and/or the depression of the brake pedal 64, that is, an output of the regenerative braking force from the motor generator MG2 is permitted so as to secure deceleration. This minimizes opportunities for motoring (rotating) the engine 10 in the fuel-cut state so as to output the friction torque (braking torque) by the motor generator MG1 (second electric motor) driven with at least the power regenerated by the motor generator MG2 (electric motor) in response to the braking demand when the deposition amount Dpm of the particulate matter is more than the threshold value Dref in the hybrid vehicle 1.

More specifically, in the hybrid vehicle 1, when the deposition amount Dpm of the particulate matter is more than the threshold value Dref, a motoring of the engine 10 by the motor generator MG1 is prohibited and the operation of the engine 10 is stopped in response to an accelerator off and/or the depression of the brake pedal 64. The braking torque corresponding to the braking demand is covered by the regenerative braking torque from motor generator MG2 and the friction braking torque from hydraulic braking device 60. Accordingly, the hybrid vehicle 1 suppresses the overheating of the particulate filter 19 due to air from the motored engine 10 to the particulate filter 19 on which the particulate matter is deposited while securing deceleration when the braking is demanded.

Further, in the hybrid vehicle 1, the target SOC is set to decrease with the increase in the deposition amount Dpm (Step S170) when the deposition amount Dpm of the particulate matter in the particulate filter 19 is more than the threshold value Dref. This enable the allowable charging power Win of the power storage device 40 to be large enough as the charging power when the deposition amount Dpm of the particulate matter increases, such that the output of the regenerative braking force from the motor generator MG2 is permitted so as to secure deceleration. Accordingly, the overheating of the particulate filter 19 due to air from the motored engine 10 is effectively suppressed. The target SOC setting map exemplified in FIG. 4 is prepared to converge the target SOC to the constant value in accordance with the increase in the deposition amount Dpm for each battery temperature Tb when the deposition amount Dpm is more than the threshold value Dref, but not limited to this. That is, the target SOC setting map may be prepared so as to set the target SOC to be smaller with the increase in the deposition amount Dpm. Further, in the hybrid vehicle 1, the target SOC is set to be smaller as the battery temperature Tb at the start of the external charging is lower (Step S170) when the deposition amount Dpm of the particulate matter in the particulate filter 19 is more than the threshold value Dref. This suppresses the decrease in the allowable charging power Win as the charging power when a large amount of particulate matter is deposited on the particulate filter 19 and the allowable charging power Win is restricted due to low temperature of the power storage device 40.

In the hybrid vehicle 1, the motor generator MG2 may be coupled to the ring gear 32 (counter drive gear 35) via a reduction gear, a transmission, or the like. Further, in the hybrid vehicle 1, the motor generator MG2 may be arranged to output a driving torque to wheels different from the wheels W with which the motor generator MG1 co-rotates. In this configuration, the transaxle connected to the crankshaft of engine 10 and the motor generator MG1 may include a stepped transmission, a continuously variable transmission, a dual clutch transmission, or the like. Furthermore, the motor generator MG1 may be coupled to the sun gear 31 of the planetary gear 30, the output member may be coupled to the ring gear 32, and the engine 10 and motor generator MG2 may be coupled to the planet carrier 34. Further, in the hybrid vehicle 1, the planetary gear 30 may be replaced by a four-element compound planetary gear mechanism including two planetary gears. In this configuration, the engine 10 may be coupled to an input element of the compound planetary gear mechanism, the output member may be coupled to an output element, the motor generator MG1 may be coupled to one of residual two rotating elements, and the motor generator MG2 may be coupled to the other. Furthermore, the compound planetary gear mechanism may be provided with a clutch that connects any two of the four rotating elements and a brake capable of fixing any one of them in a non-rotatable manner.

Figure 5:
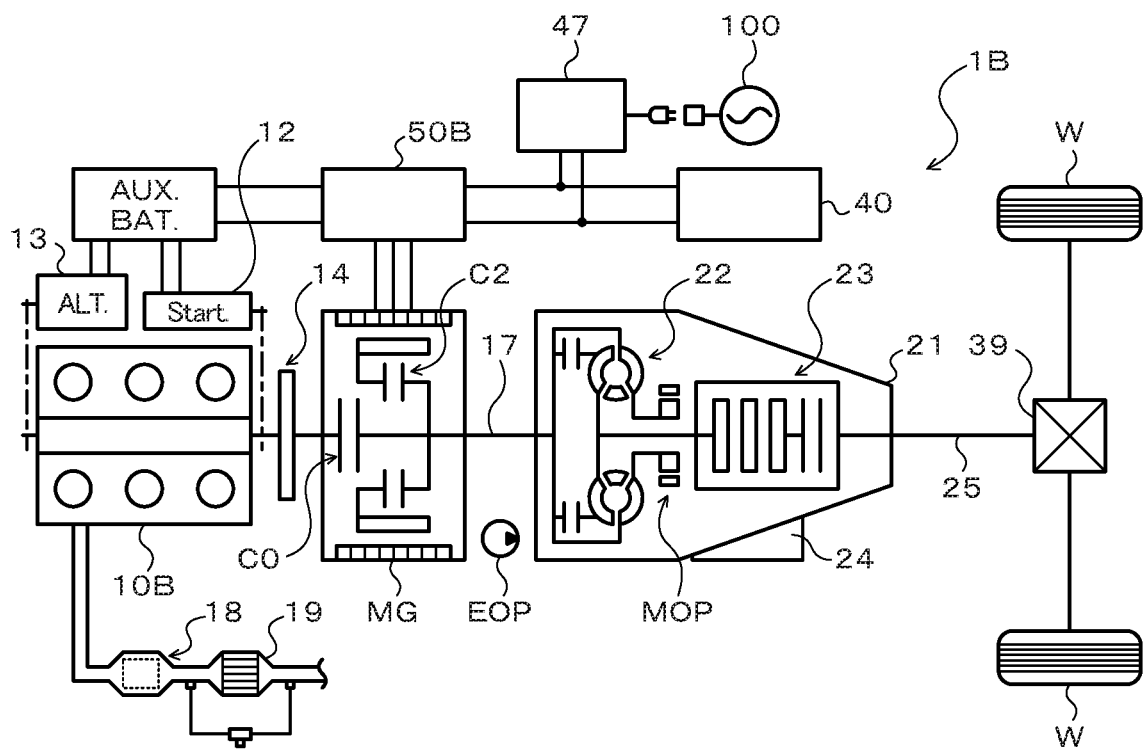
FIG. 5 is a schematic configuration diagram illustrating another plug-in hybrid vehicle according to the present disclosure.

FIG. 5 is a schematic configuration diagram illustrating another plug-in hybrid vehicle 1B according to the present disclosure. Among components of the hybrid vehicle 1B, the same components to those of the hybrid vehicle 1 described above are expressed by the same reference signs and their repeated description is omitted.

The hybrid vehicle 1B shown in FIG. 5 is a parallel hybrid vehicle configured to include an engine 10B, a motor generator MG, a power transmission 21, the power storage device 40 chargeable with the electric power from the external power supply 100, a HVECU (not shown) as a controller for controlling the entire vehicle, and the like. The engine 10B is an internal combustion engine controlled by an engine ECU (not shown) and includes a starter 12, an alternator 13 driven by the engine 10B to generate electric power, and the like, in addition to the exhaust purification device 18 and the particulate filter 19. The motor generator MG is a synchronous motor generator that exchanges electric power with the power storage device 40 via a PCU 50B controlled by an MGECU (not shown). Further, the hybrid vehicle 1B includes a normally open clutch C0 (first clutch) that connects and disconnects a crankshaft of the engine 10B and a transmission shaft 17 via the damper mechanism 14, and a normally closed clutch C2 (second clutch) that connects and disconnects a rotor of the motor generator MG and the transmission shaft 17.

The power transmission 21 includes a staring device 22, a mechanical oil pump MOP, a transmission mechanism (automatic transmission) 23, a hydraulic control device 24, and the like. The staring device 22 includes with a lockup clutch, a torque converter (fluid transmission device) and the like. The transmission mechanism 23 is, for example, a 4-speed to 10-speed automatic transmission mechanism with a plurality of planetary gears, a plurality of clutches and brakes (frictional engagement elements). The transmission mechanism 23 shifts a power transmitted from the transmission shaft 17 or an input member via the starting device 22 in multiple steps and outputs the power to an output shaft (output member) 25. That is, in hybrid vehicle 1B, the engine 10B and the motor generator MG output a driving torque and a braking torque to wheels W via the transmission shaft 17, the transmission mechanism 23, the output shaft 25 and the differential gear 39. The hydraulic control device 24 is controlled by a transmission ECU (not shown) so as to regulate a hydraulic pressure from the mechanical oil pump MOP or an electric oil pump EOP, and supplies the hydraulic pressure to the lockup clutch, the torque converter, the clutches and brakes of the transmission mechanism 23, and the like. The hydraulic pressure from the hydraulic pressure control device 24 is also supplied to the clutches C0 and C2. The clutches C0 and C2 are controlled by the transmission ECU in accordance with command signals from the HVECU.

Also in the hybrid vehicle 1B, the external charge control routine of FIG. 3 may be executed so as to obtain the same advantage as that of the hybrid vehicle 1 described above. As a result of the execution of the above routine of FIG. 3 in the hybrid vehicle 1B, when the deposition amount Dpm of the particulate matter in the particulate filter 19 is more than the threshold value Dref, the SOC of the power storage device 40 at the completion of the external charging becomes lower compared to when the deposition amount Dpm is equal to or less than the threshold value Dref. Thus, the allowable charging power Win of the power storage device 40 becomes large as the charging power when the deposition amount Dpm of the particulate matter is more than the threshold value Dref and the particulate filter 19 may overheat, such that the power storage device 40 is charged with the electric power regenerated by the motor generator MG in response to the braking demand, that is, the output of the regenerative braking force from the motor generator MG is permitted so as to secure deceleration. This minimizes opportunities for motoring (rotating) the engine 10B in the fuel-cut state so as to output a friction torque (braking torque) by the motor generator MG driven with the electric power from the power storage device 40 when the deposition amount of the particulate matter is more than the threshold value Dref in the hybrid vehicle 1B. Accordingly, the hybrid vehicle 1B suppresses the overheating of the particulate filter 19 due to air from the motored engine 10B to the particulate filter 19 on which the particulate matter is deposited while securing deceleration when the braking is demanded.

At least one of the torque converter and the lockup clutch may be omitted from the power transmission 21 of the hybrid vehicle 1B. Further, at least one of the starter 12, the alternator 13 and the clutches C0 and C2 may be omitted from the hybrid vehicle 1B. The transmission mechanism 23 may be a continuously variable transmission mechanism (CVT), a dual clutch transmission (DCT), or the like.

Further, in hybrid vehicle 1B, the motor generator MG may be coupled to the output shaft 25 instead of the transmission shaft 17. Furthermore, the hybrid vehicle 1B may be configured as a four-wheel drive vehicle that distributes the power output to the output shaft 25 to front wheels and rear wheels by a transfer (not shown).

Figure 6:
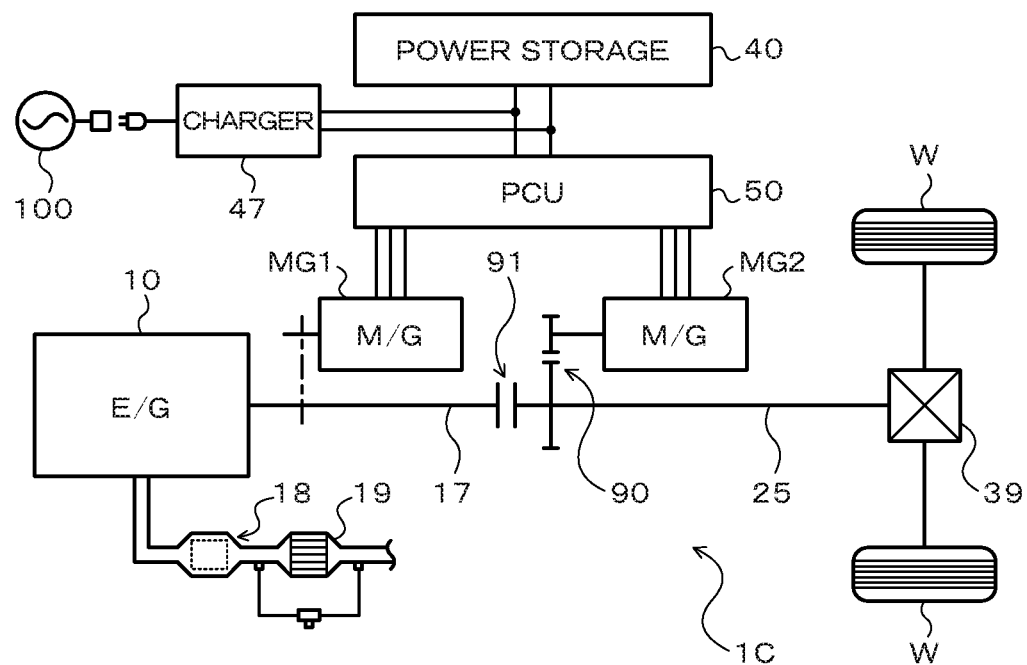
FIG. 6 is a schematic configuration diagram illustrating yet another plug-in hybrid vehicle according to the present disclosure.

FIG. 6 is a schematic configuration diagram illustrating yet another plug-in hybrid vehicle 1C according to the present disclosure. Among components of the hybrid vehicle 1C, the same components to those of the hybrid vehicle 1 and the like described above are expressed by the same reference signs and their repeated description is omitted.

The hybrid vehicle 1C shown in FIG. 6 is a series-parallel type hybrid vehicle configured to include the engine 10 with the particulate filter 19, the motor generators MG1 and MG2 capable of exchanging power with each other via the PCU 50, the power storage device 40 capable of exchanging power with the motor generators MG1 and MG2 via the PCU 50 and chargeable by the electric power from the power supply 100, an HVECU (not shown) as a control device for controlling the entire vehicle, and the like. In hybrid vehicle 1C, the crankshaft of engine 10 and the rotor of the motor generator MG1 are coupled to the transmission shaft 17, and the motor generator MG1 generates electric power with at least a part of the power from engine 10. Further, the motor generator MG2 is coupled to the output shaft 25 via a power transmission mechanism 90 such as a gear train (or directly). The hybrid vehicle 1C further includes a clutch 91 that connects and disconnects the transmission shaft 17 and the output shaft 25. Thus, when the clutch 91 is engaged in the hybrid vehicle 1C, the driving torque or the braking torque (friction torque) from the engine 10 may be output to the output shaft 25, that is, the wheels W. In hybrid vehicle 1C, the motor generator MG2 may be coupled to wheels (not shown) other than wheels W.

Also in the hybrid vehicle 1C, the external charge control routine of FIG. 3 may be executed so as to obtain the same advantage as that of the hybrid vehicle 1 described above. As a result of the execution of the above routine of FIG. 3 in the hybrid vehicle 1C, when the deposition amount Dpm of the particulate matter in the particulate filter 19 is more than the threshold value Dref, the SOC of the power storage device 40 at the completion of the external charging becomes lower compared to when the deposition amount Dpm is equal to or less than the threshold value Dref. Thus, the allowable charging power Win of the power storage device 40 becomes large as the charging power when the deposition amount Dpm of the particulate matter is more than the threshold value Dref and the particulate filter 19 may overheat, such that the power storage device 40 is charged with the electric power regenerated by the motor generator MG2 in response to the braking demand, that is, the output of the regenerative braking force from the motor generator MG2 is permitted so as to secure deceleration. This minimizes opportunities for motoring (rotating) the engine 10 in the fuel-cut state so as to output the friction torque (braking torque) by the motor generator MG1 (second electric motor) driven with at least the power regenerated by the motor generator MG2 (electric motor) in response to the braking demand when the deposition amount of the particulate matter is more than the threshold value Dref in the hybrid vehicle 1C. Accordingly, the hybrid vehicle 1C suppresses the overheating of the particulate filter 19 due to air from the motored engine 10 to the particulate filter 19 on which the particulate matter is deposited while securing deceleration when the braking is demanded.

Figure 7:
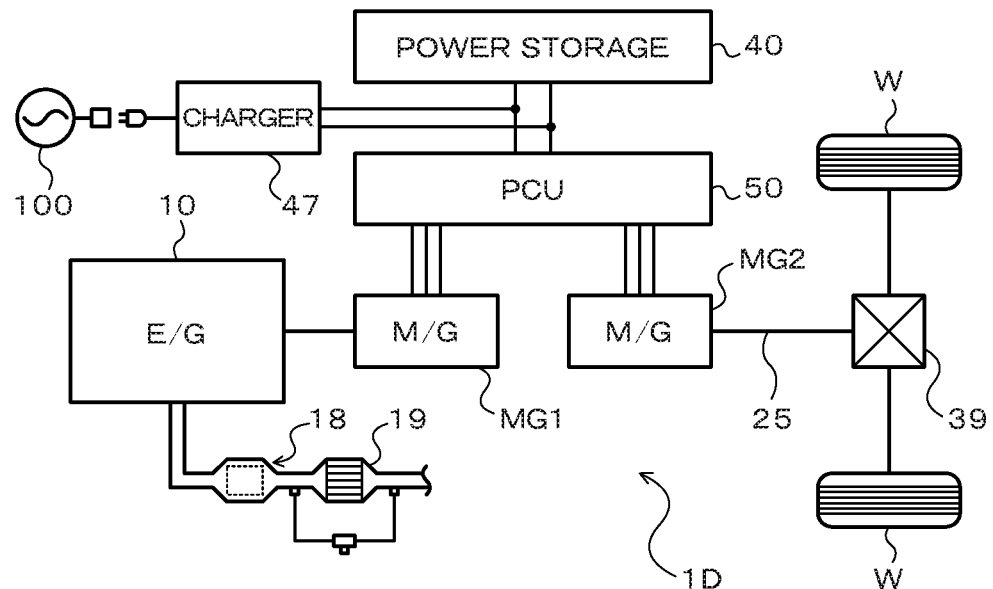
FIG. 7 is a schematic configuration diagram illustrating another plug-in hybrid vehicle according to the present disclosure.

FIG. 7 is a schematic configuration diagram illustrating another plug-in hybrid vehicle 1D according to the present disclosure. Among components of the hybrid vehicle 1D, the same components to those of the hybrid vehicle 1 and the like described above are expressed by the same reference signs and their repeated description is omitted.

The hybrid vehicle 1D shown in FIG. 7 is a series type hybrid vehicle configured to include the engine 10 with the particulate filter 19, the motor generators MG1 and MG2 capable of exchanging power with each other via the PCU 50, the power storage device 40 capable of exchanging power with the motor generators MG1 and MG2 via the PCU 50 and chargeable by the electric power from the power supply 100, an HVECU (not shown) as a control device for controlling the entire vehicle, and the like. In the hybrid vehicle 1D, the motor generator MG1 is coupled to the crankshaft of the engine 10 and operates as a generator driven by the engine 10. That is, engine 10 is used exclusively to drive the motor generator MG1 or the generator. The motor generator MG2 is coupled to wheels W via the output shaft 25, a reduction gear (not shown), the differential gear 39 and the like.

Also in the hybrid vehicle 1D, the external charge control routine of FIG. 3 may be executed so as to obtain the same advantage as that of the hybrid vehicle 1 described above. As a result of the execution of the above routine of FIG. 3 in the hybrid vehicle 1D, when the deposition amount Dpm of the particulate matter in the particulate filter 19 is more than the threshold value Dref, the SOC of the power storage device 40 at the completion of the external charging becomes lower compared to when the deposition amount Dpm is equal to or less than the threshold value Dref. Thus, the allowable charging power Win of the power storage device 40 becomes large as the charging power when the deposition amount Dpm of the particulate matter is more than the threshold value Dref and the particulate filter 19 may overheat, such that the power storage device 40 is charged with the electric power regenerated by the motor generator MG2 (electric motor) in response to the braking demand, that is, the output of the regenerative braking force from the motor generator MG2 is permitted so as to secure deceleration. This minimizes opportunities for motoring (rotating) the engine 10 in the fuel-cut state so as to output the friction torque (braking torque) by the motor generator MG1 (second electric motor) driven with at least the power regenerated by the motor generator MG2 (electric motor) in response to the braking demand (by the motor generator MG1 that consumes the regenerative power) when the deposition amount of the particulate matter is more than the threshold value Dref in the hybrid vehicle 1D. Accordingly, the hybrid vehicle 1D suppresses the overheating of the particulate filter 19 due to air from the motored engine 10 to the particulate filter 19 on which the particulate matter is deposited while securing deceleration when the braking is demanded.

The above plug-in hybrid vehicles 1, 1B, 1C and 1D of the present disclosure are configured to include the engine 10 or 10B, the particulate filter 19 configured to collect the particulate matter in the exhaust gas of the engine 10 or 10B, the motor generator MG2 or MG that outputs the driving force and the regenerative braking torque to the wheels W, the power storage device 40 that exchanges electric power with the motor generator MG2 or MG and is chargeable with the electric power from the external power supply 100, and the HVECU 70 programmed to decrease the target SOC for charging the power storage device 40 with the electric power from the external power supply 100 when the deposition amount Dpm of the particulate matter in the particulate filter 19 is more than the threshold value (predetermined value) Dref, compared to when the deposition amount Dpm of the particulate matter in the particulate filter is equal to or less than the threshold value Dref. Accordingly, the plug-in hybrid vehicles 1, 1B, 1C and 1D suppress the overheating of the particulate filter 19 due to air from the engine 10 or 10B in the fuel-cut state to the particulate filter 19 on which the particulate matter is deposited while securing deceleration when the braking is demanded.

As has been described above, a plug-in hybrid vehicle of the present disclosure is configured to include an internal combustion engine, a particulate filter configured to collect particulate matter in exhaust gas of the internal combustion engine, an electric motor that outputs a driving force and a regenerative braking force to a wheel, and a power storage device that exchanges electric power with the electric motor and is chargeable with electric power from an external power supply. The plug-in hybrid vehicle includes a controller programmed to decrease a target SOC for charging the power storage device with the electric power from the external power supply when a deposition amount of the particulate matter in the particulate filter is more than a predetermined value, compared to when the deposition amount of the particulate matter in the particulate filter is equal to or less than the predetermined value.

In the plug-in hybrid vehicle of the present disclosure, when the deposition amount of the particulate matter in the particulate filter is more than the predetermined value, the target SOC for charging the power storage device with the electric power from the external power supply, or SOC of the power storage device at the completion of a charging with the electric power form the external power supply becomes lower compared to when the deposition amount of the particulate matter in the particulate filter is equal to or less than the predetermined value. Thus, an allowable charging power of the power storage device becomes large enough as a charging power when the deposition amount of the particulate matter is more than the predetermined value, such that the power storage device is charged with electric power regenerated by the electric motor in response to a braking demand, that is, an output of a regenerative braking force from the electric motor is permitted so as to secure deceleration. This decreases opportunities for rotating the internal combustion engine in a fuel-cut state in response to the braking demand when the deposition amount of the particulate matter is more than the predetermined value. Accordingly, the plug-in hybrid vehicle of the present disclosure suppresses overheating of the particulate filter due to air from the internal combustion in the fuel-cut state to the particulate filter on which the particulate matter is deposited while securing deceleration when braking is demanded.

The controller may be programmed to set the target SOC to decrease with an increase in the deposition amount when the deposition amount is more than the predetermined value. This enable the allowable charging power of the power storage device to be large as the charging power when the deposition amount of the particulate matter increases, such that the output of the regenerative braking force from the electric motor is permitted so as to secure deceleration. Accordingly, the overheating of the particulate filter due to air from the internal combustion in the fuel-cut state is effectively suppressed.

The controller may be programmed to set the target SOC to be smaller as a temperature of the power storage device at a start of a charging with the electric power form the external power supply is lower when the deposition amount is more than the predetermined value. This suppresses a decrease in the allowable charging power as the charging power when a large amount of particulate matter is deposited on the particulate filter and the temperature of the power storage device is low.

The internal combustion engine may be coupled to the wheel via a transmission, and the electric motor may be coupled to either an input member or an output member of the transmission. In this plug-in hybrid vehicle, the target SOC may be set in accordance with the deposition amount of the particulate matter in the particulate filter, such that the output of the regenerative braking force from the electric motor is permitted so as to secure deceleration instead of motoring the internal combustion engine so as to output a braking force (friction torque) by the electric motor driven with electric power from the power storage device when a large amount of particulate matter is deposited on the particulate filter. Accordingly, the overheating of the particulate filter is effectively suppressed while securing deceleration when the braking is demanded.

The plug-in hybrid vehicle may further include a second motor that exchanges electric power with the electric motor and the power storage device and generates electric power with at least part of power form the internal combustion engine. In this plug-in hybrid vehicle, the target SOC may be set in accordance with the deposition amount of the particulate matter in the particulate filter, such that the output of the regenerative braking force from the electric motor is permitted so as to secure deceleration instead of motoring the internal combustion engine in the fuel-cut state by the second electric motor driven with at least electric power regenerated by the electric motor in response to the braking demand when a large amount of particulate matter is deposited on the particulate filter. Accordingly, the overheating of the particulate filter is effectively suppressed while securing deceleration when the braking is demanded.

The internal combustion engine may output power to either the wheel or another wheel. In this plug-in hybrid vehicle, the target SOC may be set in accordance with the deposition amount of the particulate matter in the particulate filter, such that the output of the regenerative braking force from the electric motor is permitted so as to secure deceleration instead of motoring the internal combustion engine so as to output the braking force (friction torque) by the second electric motor driven with at least electric power regenerated by the electric motor in response to the braking demand when a large amount of particulate matter is deposited on the particulate filter. Accordingly, the overheating of the particulate filter is effectively suppressed while securing deceleration when the braking is demanded.

A method of the present disclosure is a control method of a plug-in hybrid vehicle configured to include an internal combustion engine, a particulate filter configured to collect particulate matter in exhaust gas of the internal combustion engine, an electric motor that outputs a driving force and a regenerative braking force to a wheel, and a power storage device that exchanges electric power with the electric motor and is charged with electric power from an external power supply. The control method includes decreasing a target SOC for charging the power storage device with the electric power from the external power supply when a deposition amount of the particulate matter in the particulate filter is more than a predetermined value, compared to when the deposition amount of the particulate matter in the particulate filter is equal to or less than the predetermined value.

The method of the present disclosure suppresses overheating of the particulate filter due to air from the internal combustion in the fuel-cut state to the particulate filter on which the particulate matter is deposited while securing deceleration when braking is demanded.

The disclosure is not limited to the above embodiments in any sense but may be changed, altered or modified in various ways within the scope of extension of the disclosure.

Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the plug-in hybrid vehicle.

The invention claimed is:

1. A plug-in hybrid vehicle that includes an internal combustion engine, a particulate filter configured to collect particulate matter in exhaust gas of the internal combustion engine, an electric motor that outputs a driving force and a regenerative braking force to a wheel, and a battery that exchanges electric power with the electric motor and is chargeable with electric power from an external power supply, the plug-in hybrid vehicle comprising:
   a controller programmed to decrease a target SOC for charging the battery with the electric power from the external power supply when a deposition amount of the particulate matter in the particulate filter is more than a predetermined value, compared to when the deposition amount of the particulate matter in the particulate filter is equal to or less than the predetermined value.

2. The plug-in hybrid vehicle according to claim 1, wherein the controller is programmed to set the target SOC to decrease with an increase in the deposition amount when the deposition amount is more than the predetermined value.

3. The plug-in hybrid vehicle according to claim 1, wherein the controller is programmed to decrease the target SOC as a temperature of the battery at a start of a charging with the electric power from the external power supply decreases, when the deposition amount is more than the predetermined value.

4. The plug-in hybrid vehicle according to claim 1, wherein the internal combustion engine is coupled to the wheel via a transmission, and wherein the electric motor is coupled to either an input member or an output member of the transmission.

5. The plug-in hybrid vehicle according to claim 1, further comprising:
   a second electric motor that exchanges electric power with the electric motor and the battery, and generates electric power with at least part of power from the internal combustion engine.

6. The plug-in hybrid vehicle according to claim 5, wherein the internal combustion engine outputs power to either the wheel or another wheel.

7. A control method of a plug-in hybrid vehicle that includes an internal combustion engine, a particulate filter configured to collect particulate matter in exhaust gas of the internal combustion engine, an electric motor that outputs a driving force and a regenerative braking force to a wheel, and a battery that exchanges electric power with the electric motor and is chargeable with electric power from an external power supply, the control method comprising:
   decreasing a target SOC for charging the battery with the electric power from the external power supply when a deposition amount of the particulate matter in the particulate filter is more than a predetermined value, compared to when the deposition amount of the particulate matter in the particulate filter is equal to or less than the predetermined value.

* * * * *